Patented Feb. 25, 1941

2,233,129

UNITED STATES PATENT OFFICE 2,233,129

PROCESS FOR THE MANUFACTURE OF TOLIDINE

Clyde O. Henke, Wilmington, Del., and Roland G. Benner, Carneys Point, N. J., assignors to E. I. du Pont de Nemours & Company, Wilmington, Del., a corporation of Delaware No Drawing. Application November 8, 1939, Serial No. 303,476

7 Claims. (Cl. 260—578)

This invention relates to a process for the manufacture of tolidine and, more particularly, to the production of tolidine from o-nitrotoluene by catalytic hydrogenation in the liquid phase.

Tolidine has heretofore been produced on a commercial scale by reduction of o-nitrotoluene with zinc dust and caustic soda to hydrazotoluene, which is inverted to tolidine by dilute acids. Although fairly good yields of tolidine are obtainable by this method, the cost of production has been high because of the high cost of zinc dust and the expense resulting from difficulties involved in separating the zinc sludge from the reduction mass.

Hydrogen has been found to be more economical for reduction of many nitro bodies to the amines than either of the older methods which involve the use of zinc or iron. However, no method has been previously developed for the production of tolidine from o-nitrotoluene with hydrogen.

Nitrobenzene has been reduced with hydrogen, in the presence of a nickel catalyst and caustic soda, to azobenzene and hydrazobenzene, which can be converted to benzidine by known methods. However, this method is not satisfactory for the manufacture of tolidine from o-nitrotoluene as very low yields of tolidine are obtained.

The present invention has as an object an improved and economical process for the production of tolidine. A further object is the production of tolidine of high quality from o-nitrotoluene. Other objects will be apparent from the reading of the following description of the invention.

These objects are accomplished by the following invention which comprises reducing o-nitrotoluene with hydrogen in the presence of an active noble metal catalyst and an alkaline medium and in an oxygen-containing, non-acidic, organic solvent having from 1 to 7 carbon atoms.

o-Nitrotoluene is reduced at temperatures below 150° C. and at hydrogen pressures above one atmosphere, in an oxygen-containing, non-acidic, organic solvent of from 1 through 7 carbon atoms, in the presence of an active noble metal catalyst, and in an alkaline medium to a mixture of hydrazotoluene, o-toluidine, and a small amount of azotoluene. The mixture is treated with hydrochloric acid and iron to convert the azo-hydrazotoluene to tolidine hydrochloride and to convert the o-toluidine to its hydrochloride. The o-toluidine hydrochloride is separated from the tolidine hydrochloride by filtration, converted to o-toluidine by the addition of lime, and distilled. The tolidine hydrochloride is washed free of isomers, o-toluidine, and solvent, and is converted to tolidine by soda ash.

The following examples set forth certain well defined instances of the application of this invention. They are, however, not to be considered as limitations thereof, since many modifications may be made without departing from the spirit and scope of this invention.

Example I

In an iron autoclave equipped for rapid agitation are charged 100 parts of o-nitrotoluene, 150 parts of the azeotropic mixture of isopropanol and water, 9 parts of caustic soda, and 0.030 part of palladium black supported on activated carbon. The charge is hydrogenated at 80° to 85° C. and under 100 to 200 lbs. per sq. in. hydrogen pressure. The absorption of hydrogen is continued until it becomes very slow. The hydrogenated mass is then taken from the autoclave, the autoclave washed, and the washings combined with the mass. The charge is then cooled to 20° to 30° C. Water is added and the mixture is cooled to 0° to 5° C. While this temperature is maintained, 180 parts of 33% hydrochloric acid are added to invert the hydrazotoluene to tolidine hydrochloride. After agitating for 4 hours at this temperature, 5 parts of iron powder are added. For 2 hours the agitation is continued at 0° to 5° C. The temperature is then gradually raised to 30° C. over a period of about 3 hours. After 4 to 5 hours' agitation at this temperature, the mass becomes gray and 65 parts of salt are added. The tolidine hydrochloride is then filtered out and washed with 200 parts of cold 15% salt solution. The filtrate is made alkaline and is then steam-distilled to recover the isopropanol and o-toluidine. The tolidine hydrochloride is dissolved in boiling water and is filtered at 100° to 101° C. The sludge is washed with boiling water, the filtrates being combined. While agitating, the filtrate is cooled to 15° to 20° C. and 100 parts of salt are added. The tolidine hydrochloride, which crystallizes out, is filtered and washed with 100 parts of cold 15% salt solution. The mass is then slurried in water and is converted to tolidine by the addition of soda ash until the slurry is alkaline. The slurry is then cooled to 20° to 25° C., filtered, and the cake washed with cold water. The tolidine is dried at 90° to 100° C. under vacuum. The material is white and has a freezing point of above 128.0° C. Yields of 60 to 70% of theory of tolidine are obtained. In addition, a yield of 20 to 25% of theory of o-toluidine is obtained.

Example II

In an iron autoclave equipped for rapid agitation are charged 100 parts of o-nitrotoluene, 150 parts of isopropanol, 15 parts of soda ash, and 0.030 part of platinum black supported on activated carbon. The charge is hydrogenated and the hydrogenated mass is converted to tolidine and o-toluidine in a manner similar to Example I.

Example III

In an iron autoclave equipped for rapid agitation are charged 100 parts of o-nitrotoluene, 150 parts of ethanol, 9 parts of caustic soda, and 0.050 part of palladium black supported on activated carbon. The charge is hydrogenated and the hydrogenated mass is converted to tolidine and o-toluidine in a manner similar to Example I.

Example IV

In an iron autoclave equipped for rapid agitation are charged 100 parts of o-nitrotoluene, 150 parts of acetone, 9 parts of caustic soda, and 0.050 part of palladium black supported on activated carbon. The charge is hydrogenated and the hydrogenated mass is converted to tolidine and o-toluidine in a manner similar to Example I.

Example V

In an iron autoclave equipped for rapid agitation are charged 100 parts of o-nitrotoluene, 150 parts of the azeotropic mixture of isopropanol and water, 3 parts of caustic soda, and 0.030 part of palladium black supported on activated carbon. The charge is hydrogenated and the hydrogenated mass is converted to tolidine and o-toluidine in a manner similar to Example I.

Example VI

In an iron autoclave equipped for rapid agitation are charged 100 parts of o-nitrotoluene, 200 parts of the azeotropic mixture of isopropanol and water, 3 parts of caustic soda, and 0.030 part of palladium black supported on activated carbon. The charge is hydrogenated and the hydrogenated mass is converted to tolidine and o-toluidine in a manner similar to Example I.

Example VII

In an iron autoclave equipped for rapid agitation are charged 100 parts of o-nitrotoluene, 150 parts of isopropanol, 6 parts of caustic soda, and 0.030 part of rhodium black supported on activated carbon. The charge is hydrogenated and the hydrogenated mass is converted to tolidine and o-toluidine in a manner similar to Example I.

Example VIII

In an iron autoclave equipped for rapid agitation are charged 100 parts of o-nitrotoluene, 67 parts of the azeotropic mixture of isopropanol and water, 2 parts of caustic soda, and 0.030 part of palladium black supported on activated carbon. The charge is hydrogenated and the hydrogenated mass is converted to tolidine and o-toluidine in a manner similar to Example I.

Example IX

In an iron autoclave equipped for rapid agitation are charged 100 parts of o-nitrotoluene, 150 parts of the azeotropic mixture of isopropanol and water, 9 parts of caustic soda, and 0.015 part of palladium black supported on activated carbon. The charge is hydrogenated and the hydrogenated mass is converted to tolidine and o-toluidine in a manner similar to Example I.

Example X

In an iron autoclave equipped for rapid agitation are charged 100 parts of o-nitrotoluene, 50 parts of the azeotropic mixture of isopropanol and water, 4.5 parts of caustic soda, and 0.020 part of palladium black supported on activated carbon. The charge is hydrogenated and the hydrogenated mass is converted to tolidine and o-toluidine in a manner similar to Example I.

Example XI

In an iron autoclave equipped for rapid agitation are charged 100 parts of o-nitrotoluene, 200 parts of the azeotropic mixture of isopropanol and water, 6 parts of caustic soda, and 0.030 part of palladium black supported on activated carbon. The charge is hydrogenated and the hydrogenated mass is converted to tolidine and o-toluidine in a manner similar to Example I.

This invention is not limited to the particular conditions cited in the above examples.

The rate of reaction is greatly influenced by the temperature, higher temperatures increasing the reduction rate, but better yields are obtained within the range of 75° to 90° C. However, the hydrogenation may be carried out from 30° to 150° C.

Hydrogen pressures of 50 to 300 lbs. per sq. in. are preferable but any pressure from atmospheric to 2000 lbs. per sq. in. and higher may be employed, the construction of the equipment limiting the upper pressures.

The proportion of solvent to o-nitrotoluene is best kept between 25% and 3 times the weight of nitro body, but may be varied from 15% to 5 times the weight of o-nitrotoluene, the lower proportion resulting in more o-toluidine formation but faster reduction. The solvent used need not be one of those mentioned in the examples cited, although higher yields are obtained with isopropanol. The solvent should be an oxygen-containing, non-acidic, organic compound of from 1 through 7 carbon atoms. This would include all aliphatic, cyclic, and aromatic alcohols, ketones, aldehydes, esters, and ethers of from 1 through 7 carbons. While ethers fall into this category, the hazards involved in their use make it inadvisable to employ them. Mixtures of the above solvents or materials resulting in the formation of them are included. Examples of these are: methanol, ethanol, n-propanol, isopropanol, n-butanol, secondary-butanol, isobutanol, tertiary-butanol, n-amyl alcohol, isoamyl alcohol, tertiary-amyl alcohol, fusel oil, "Pentasol" (a commercial mixture of amyl alcohols), n-hexanol, acetone, methyl ethyl ketone, diethyl ketone, formaldehyde, acetaldehyde, propionaldehyde, butyraldehyde, cyclohexanol, benzyl alcohol, etc.

The amount of catalyst employed is preferably between 0.005 and 0.050% based on the weight of nitro body, but may be decreased as long as it shows activity, or increased, as desired. The use of more than 0.5% noble metal in the catalyst, based on the nitrotoluene, makes the process impractical due to the cost of the metal. The catalyst may be palladium black, platinum black or rhodium black and is preferably prepared in accordance with U. S. application Serial No. 303,475, filed of even date herewith. However, the noble metal compounds may be used, as well as mixtures or other physical forms of the metals, such as colloids and the like. They are preferably supported on activated carbon but they may be unsupported or supported on any inert carrier such as, for example, charcoal, kieselguhr, asbestos, fuller's earth, filtercel, bentonite, vermiculite, monox, silica, and the like. The catalyst may be recovered by filtering the autoclave charge or it may be filtered off with the unreacted iron after the inversion is completed.

The alkaline material is preferably caustic soda in amounts of 2 to 10% of the weight of o-nitrotoluene, but the proportion may be varied from 0.5 to 50% or more of the weight of nitro body. The equivalent of any material resulting in an alkaline medium under the conditions employed may also be used. Lower alkalinity decreases the yield of tolidine; more alkaline material decreases the rate of reduction. The most common alkaline materials are the oxides, hydroxides, salts of weak acids, alcoholates, and phenolates of the alkali and of the alkaline earth metals, as well as strong organic bases or salts, various compounds of the nitrogen system, and various compounds of other metals, such as magnesium. Examples of the above are: sodium hydroxide, potassium hydroxide, calcium hydroxide, barium hydroxide, strontium hydroxide, ammonium hydroxide, sodium carbonate, potassium carbonate, sodium oxide, potassium oxide, calcium oxide, barium oxide, strontium oxide, sodium acetate, potassium acetate, calcium acetate, barium acetate, strontium acetate, sodium stearate, potassium stearate, sodium silicates, potassium silicates, trisodium phosphate, tripotassium phosphate, etc. Free alkali and alkaline earth metals will react to produce an alkaline medium. The essential detail is that the charge to be hydrogenated should be in an alkaline medium.

Water may or may not be present in the charge to be hydrogenated. If water is to be present, it may be added separately or by means of an aqueous solution of the solvent or of the alkaline material.

The aceotropic mixture of isopropanol and water cited in some of the examples contains about 88% isopropanol.

The hydrogen employed is preferably electrolytic hydrogen gas but may be obtained from any other source, and gases in which hydrogen is present, such as water-gas, may be used.

By the preceding methods, tolidine of exceptionally high purity is obtainable with considerable more economy than by previous commercial methods. Yields up to 70% of theory of tolidine are obtainable with o-toluidine as a valuable by-product. At least 80 to 90% of theory of useful products is obtainable.

It is apparent that many widely different embodiments of this invention may be made without departing from the spirit and scope thereof and therefore it is not intended to be limited except as indicated in the appended claims.

We claim:

1. The process which comprises catalytically hydrogenating o-nitrotoluene in an alkaline medium and in an oxygen-containing, non-acidic, organic solvent having from 1 to 7 carbon atoms while in contact with a noble metal hydrogenation catalyst at a temperature within the range of 30° to 150° C.

2. The process in accordance with claim 1 characterized in that the organic solvent is an alcohol.

3. The process in accordance with claim 1 characterized in that the organic solvent is an aliphatic alcohol.

4. The process in accordance with claim 1 characterized in that the organic solvent is isopropanol.

5. The process in accordance with claim 1 characterized in that the catalyst is a palladium catalyst.

6. The process in accordance with claim 1 characterized in that the alkaline medium is a sodium hydroxide medium.

7. The process which comprises catalytically hydrogenating o-nitrotoluene in the presence of a palladium catalyst, in isopropyl alcohol, and in a sodium hydroxide medium at a temperature within the range of 30° to 150° C.

CLYDE O. HENKE.
ROLAND G. BENNER.